Figure 1:
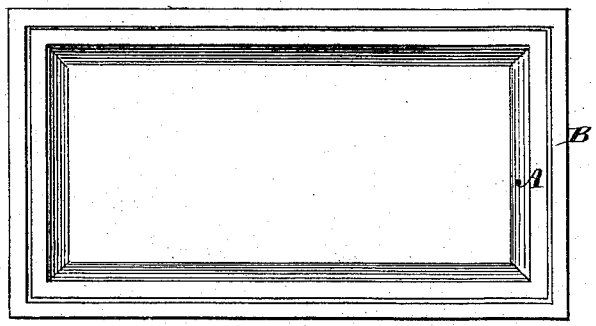

J. O. DONNER.
Apparatus for the Manufacture of Hard Sugar.

No. 160,656. Patented March 9, 1875.

UNITED STATES PATENT OFFICE.

JOHN OTTO DONNER, OF NEW YORK, N. Y.

IMPROVEMENT IN APPARATUS FOR THE MANUFACTURE OF HARD SUGAR.

Specification forming part of Letters Patent No. 160,656, dated March 9, 1875; application filed September 15, 1874.

*To all whom it may concern:*

Be it known that I, JOHN OTTO DONNER, of the city, county, and State of New York, have invented an Improvement in Apparatus for the Manufacture of Hard Sugar, of which the following is a specification:

This invention relates to the manufacture of hard sugar within molds in a centrifugal machine, and differs essentially from those methods of making hard sugar in which the molds, while empty, are inserted within the basket of the centrifugal machine, and filled with the magma of sugar and sirup after the machine has been set in motion; also, equally differs from another method, in which the molds are first filled with the magma or sugar mass as it comes from the vacuum-pan, and afterward inserted in the centrifugal machine to effect the expulsion of the green sirup; then said molds removed from such machine, and the cleansing or washing effected by means outside of the centrifugal machine, and subsequently the molds reinserted in said machine, for the purpose of draining the mass in the molds of the cleansing solution. As in this latter method, the molds in my improvement are first filled with the sugar-magma as it comes from the vacuum-pan, and are then inserted in the centrifugal machine, but do not require to be removed from the latter, nor said machine require to be stopped till the green sirup has been expelled, the magma washed by the cleansing solution, and drainage of the latter is effected.

Heretofore it has been deemed impracticable to thus wash or cleanse the sugar-magma in the molds within the centrifugal machine, or, at least, to perfectly do so, inasmuch as the white sugar solution, when ejected or sprayed against the sugar in the molds while the latter (which are arranged to form a wall around the interior of the basket of the centrifugal machine) rotate with the latter, fails to reach and evenly penetrate the mass of sugar. The reason for this has been the impossibility, with the means heretofore adopted, of filling the molds or forms to their extreme upper edge by reason of the shrinkage of the mass in cooling, and from other causes, and the difficulty of handling them. Hence, supposing the molds thus partially filled to be inserted within the centrifugal machine and put into rapid revolution, the internally-projecting edges of the molds, due to the partial filling of the molds, will catch the greater part of the washing solution which passes through the sugar nearest to such edges, and restrains the solution from reaching directly the inner surface of the sugar as evenly as is desirable, in order to obtain an evenly white mass of sugar.

Such difficulties are obviated by this invention by employing, in connection with the molds containing the mass to be treated, other and larger molds or boxes when filling the former, and into which larger molds the smaller or sugar molds are inserted before being filled with the sugar-magma as it comes from the vacuum-pan. Each outer or larger mold is constructed to receive snugly within it the smaller or sugar mold, so that the latter may be readily inserted or removed from the former, and not allow of sugar passing in between them; but the larger mold is somewhat deeper than the smaller and inner one, thereby causing the edge of the outer mold to project slightly above the edge of the inner mold. By means of this projecting edge of the outer mold the inner mold may be filled to above its upper edge, the outer mold at the same time forming a second or false bottom for the inner mold, and dispensing with a movable lid or bottom, india-rubber packing thereto, and clamps for securing the same.

The general contour of the molds may be varied, but it will be sufficient to describe the two forms and construction shown in the drawing.

Figure 2:
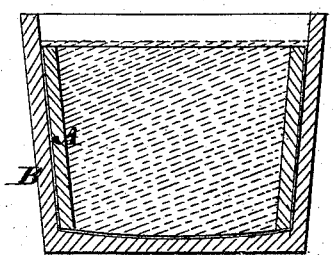
Figure 3:
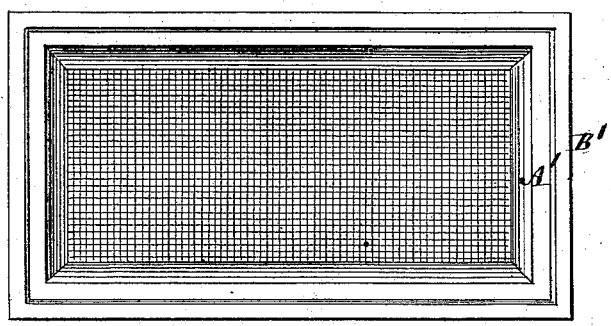
Figure 4:
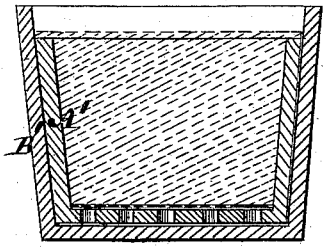
Figure 5:
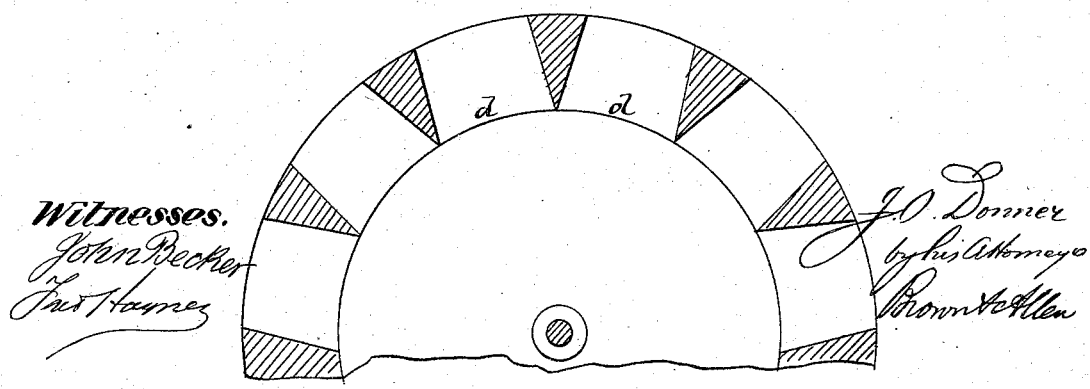

Figure 1 is a plan, and Fig. 2 a transverse vertical section, of an inner mold having an open bottom, and arranged within an outer mold, in illustration of the filling of the inner mold. Figs. 3 and 4 are similar views of a like arrangement of inner and outer molds, but showing the inner mold as having a perforated bottom. Fig. 5 is a diagram in illustration of the placing of the filled molds within the centrifugal machine.

A A' are the inner molds, and B B' the outer molds. When the mold A' is used the outer mold B' has a straight bottom like the inner mold, but without perforations in it. When the mold A is used, the bottom of the outer mold B is segmental, in conformity with the curvature of the basket of the centrifugal machine. If desired, an inner mold of reverse tapering shape to the mold A may be used, and the bottom of the outer mold have also a segmental bottom, as in the case of the mold B; but this construction or arrangement would require the use of tapering blocks between the sides of the inner and outer molds, to prevent waste of sugar by the magma passing down between the molds, so that the blocks filling the vacant spaces between the sides of the mold virtually make a close fit of the molds, the one within the other. The molds may be made of iron, copper, or any other suitable material, and their interior surfaces be painted or enameled. Their shape may be varied, as also their sizes. The mold A', having a perforated bottom, does not require the centrifugal machine to be provided with a sieve or perforated plate; but a skeleton machine, receiving said molds within and around it, with the perforated bottoms of the molds arranged outward, will answer. When, however, open-bottom molds—such, for instance, as the mold A—are used, then the centrifugal machine should be provided with a perforated plate, covering the interior of the basket, against which the molds are placed.

The operation is as follows: A number of inner molds are inserted within their respective outer and deeper molds, and filled with the sugar-magma as it comes from the vacuum-pan, with a surplus of such magma within the upper part of the outer mold, so as to cover for about one-eighth of an inch, more or less, the upper edges of the inner mold, as shown in Figs. 3 and 4. The mass is then allowed to cool and harden, after which the inner mold, together with the sugar, is knocked out or otherwise removed from the outer mold. To prevent the sticking of the inner mold within the outer one, and to facilitate its removal along with the sugar therefrom, the outer mold may be provided with an air-hole in its bottom to admit air between the molds. The surface of the hardened mass of sugar is then scraped down to as near a level with the edge of the inner mold as practicable, whereby an even weight in all the molds is better secured and the sugar better prepared for further operation. A number of these inner filled molds are then inserted, as usual, around the inner basket of a centrifugal machine, as indicated by the spaces $d$ in the diagram, Fig. 5, and the green sirup removed by centrifugal force, after which the cleansing process, by means of a white saturated solution of sugar, is applied without stopping the machine or removing the molds. Such cleansing is evenly effected by reason of the method, hereinbefore described, of filling the molds through the aid of the outer boxes or supplementary molds, inasmuch as the sugar contained in the molds, which are inserted in the machine, forms one unbroken wall toward the interior of the centrifugal machine, free from any protrusion of the edge of the molds, so that as the cleansing solution is ejected or sprayed against it, the sugar will be reached directly, and the solution be caused to penetrate the same as evenly as applied, without being caught in its progress by projecting edges of the molds. After the washing or cleansing has been effected the cleansing solution is thrown off or drained from the sirup by the continued or repeated action of the centrifugal machine, which latter is then stopped and the molds with the sugar removed. Said molds, with their contents, are then either taken directly to the drying-room or store, or the sugar is knocked out of the mold and alone transferred to be dried, leaving the molds ready for another filling and operation, as before.

I claim—

In the manufacture of hard sugar by the centrifugal machine, the combination, with the molds containing the sugar-magma, of supplementary molds or outer boxes, each constructed to form a false bottom to its respective inner mold during the filling of the latter, and of greater depth than the inner mold, to insure the perfect filling of the latter, substantially as specified.

J. O. DONNER.

Witnesses:
 HENRY T. BROWN,
 MICHAEL RYAN.